W. V. SMYTH.
ADJUSTABLE EXPANSION COUPLING.
APPLICATION FILED SEPT. 2, 1916.

1,263,953.

Patented Apr. 23, 1918.
2 SHEETS—SHEET 1.

WITNESSES
G. V. Rasmussen
Ralph E. Slayton

INVENTOR
WILLIAM V. SMYTH
BY
ATTORNEYS

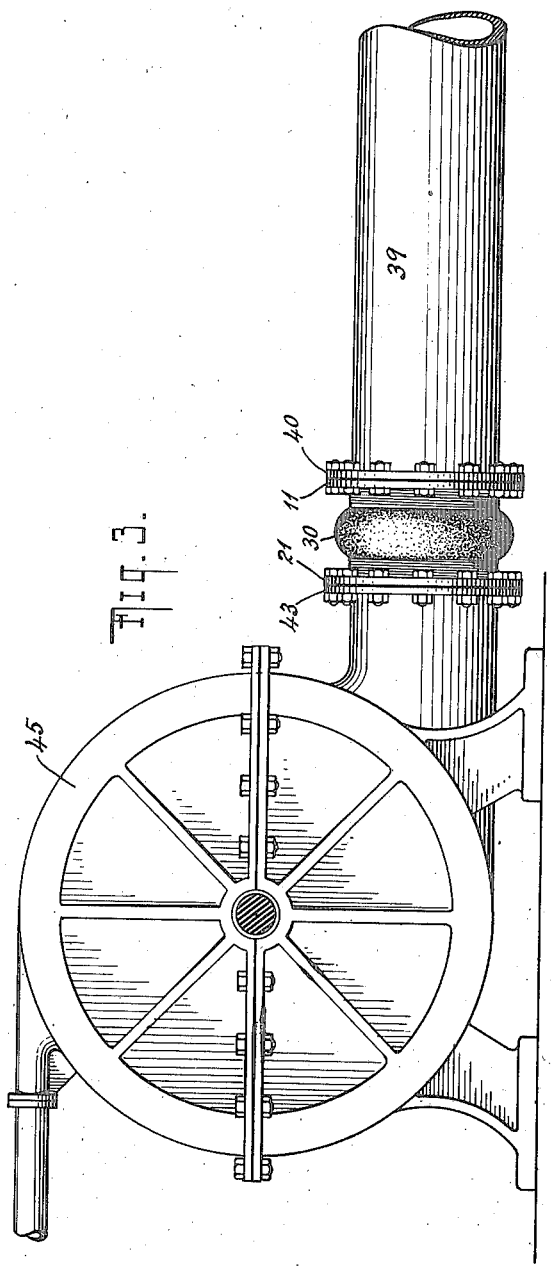

UNITED STATES PATENT OFFICE.

WILLIAM V. SMYTH, OF JERSEY CITY, NEW JERSEY.

ADJUSTABLE EXPANSION-COUPLING.

1,263,953.      Specification of Letters Patent.      Patented Apr. 23, 1918.

Application filed September 2, 1916. Serial No. 118,227.

*To all whom it may concern:*

Be it known that I, WILLIAM V. SMYTH, a citizen of the United States, and resident of Jersey City, in the county of Hudson and State of New Jersey, have invented certain new and useful Improvements in Adjustable Expansion-Couplings, of which the following is a specification.

My invention relates to couplings and particularly to couplings of comparatively large diameter for use in apparatus which is subject to vibration.

The principal object is to provide a cheap, durable coupling. Another object is to provide a coupling which will remain fluid tight. A further object is to provide a coupling which will adapt itself to various changes in the position of the members joined by the coupling without becoming permanently distorted or injured thereby. A still further object is to provide a coupling which may be transported in its manufactured form without liability to injury. Other objects will hereinafter appear.

My invention is chiefly characterized by the fact that I employ rubber especially when strengthened with duck, or other similar material, as the expansion medium in the coupling. Rubber is known to deteriorate quickly and to lose its elasticity when in contact with highly heated fluids, especially steam. I have discovered, however, that if the rubber is subjected to vibration the deteriorating action of the highly heated fluid is counteracted and the rubber will retain its resiliency and thereby form suitable material for a coupling, without the necessity of cooling the rubber.

The size of the couplings required on the larger machines for which I contemplate employing my device sometimes measure over 12 feet in diameter. It will be understood that to provide a coupling of this size and subject to vibration presents difficulties not present in the construction of smaller couplings.

All efforts up to the present to produce commercially practical couplings of this character have resulted in failures. Copper or a similar metal has been tried with the idea that a soft metal of this character would, through its inherent ductility, adjust itself to variations in distance and allow for vibration. Couplings of this metal have, however, not worked well in practice as it has been found that after short use the copper granulates by reason of the vibration, thereby destroying the coupling.

Figure 1:
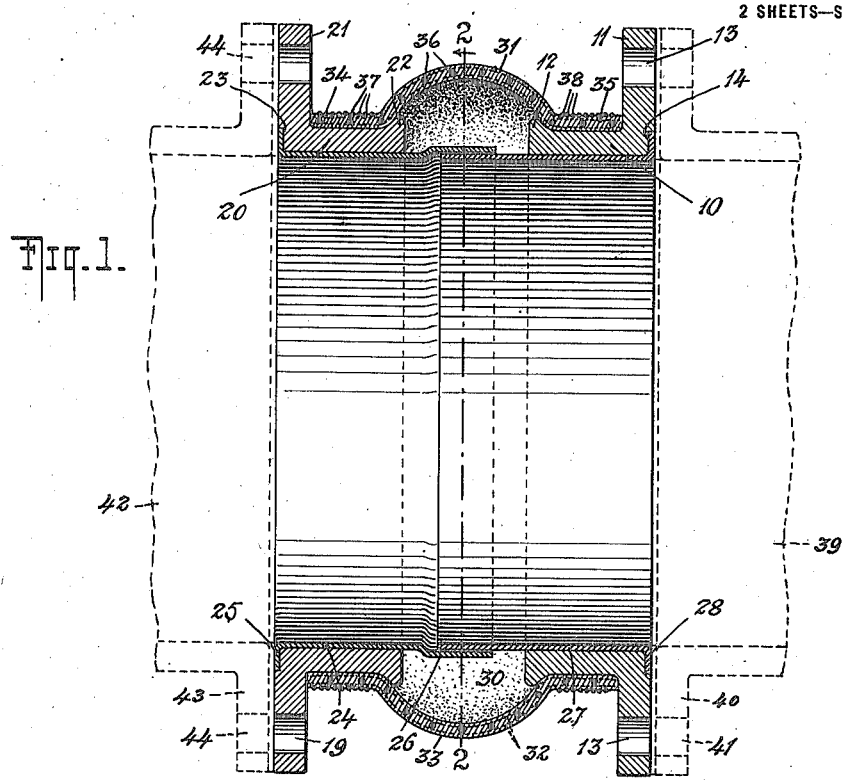
Figure 2:
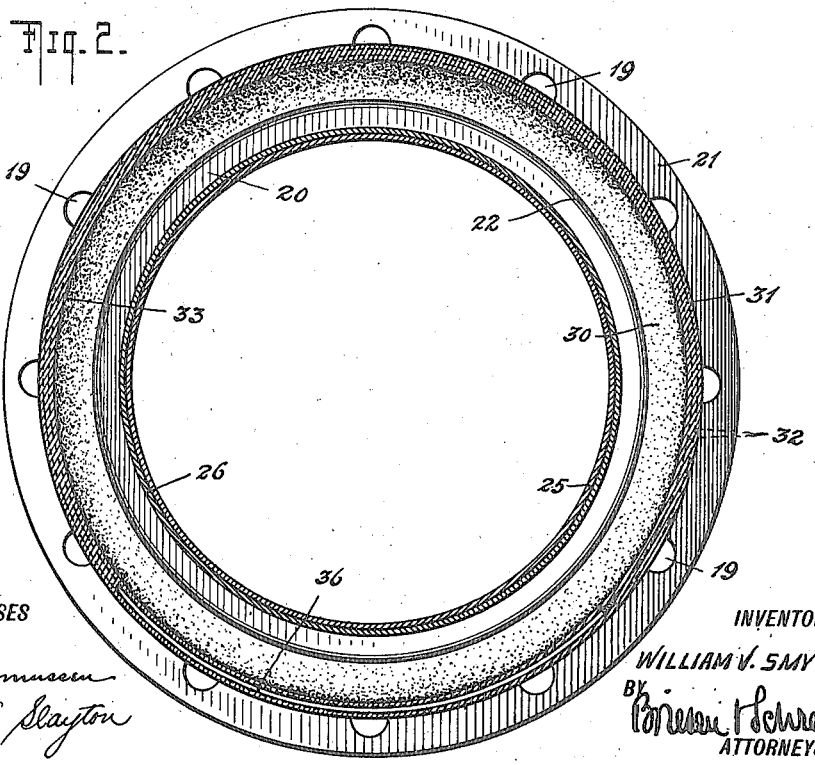

In the accompanying drawings forming part of this application, Figure 1 is an axial section of an example of my coupling, Fig. 2 is a section of Fig. 1 on the line 2—2 and Fig. 3, an elevation of my device connected with a suitable agitating mechanism. It is to be understood that this example is illustrative only and that my invention is not limited thereto.

Referring to the drawings, one of the members of the coupling 10 is provided at one end with an annular flange 11 and at the other an annular shoulder portion 12. In the flange 11 are located a plurality of circumferentially disposed openings 13. An annular recess 14 is provided for the flange 11 at the inner peripheral edge thereof. An annular member 20 similar to member 10 is also provided and has an annular flange 21 at one end thereof similar to flange 11 and an annular shoulder 22 similar to shoulder 12 at the other end thereof. A plurality of openings 24 similar to the openings 13 are provided in the flange 11. The annular flange 21 has an annular recess 23 located on its inner peripheral edge. Bearing against and conforming to the inner circumferential surface of the member 20, a member 24 of a telescopic metallic lining is shown. This lining may be of copper, or a similar metal. The member 24 is provided at one end with a flange 25 which occupies the recess 23 and at the other with a bell end 26. A similar metallic lining member 27 is provided for the member 10 and has at one end thereof a flange 28 which registers with the recess 14 and the other end thereof slidably engages the bell end 26 of the member 24. The annular members 10 and 20 are joined by a casing indicated in its entirety by 30 which consists of a rubber sheet 31 with canvas sheetings 32 or the like embedded in the said rubber 31. The casing may also be built up of alternate layers of rubber and canvas, the rubber layers preferably, finishing the series at both sides, so that the duck may be protected from moisture by the rubber. The casing has the annular crown 33 and the flanges 34 and 35. Embedded in the casing 30 and passing helically therethrough is a reinforcing wire 36. The flange 34 bears against the annular member 10 and the shoulder portion 12 thereof and the opposite flange 35 of the member 28 bears against the annular member 20 and the shoulder 22 thereof. A wire is helically wound around the flange 34 to maintain said flange in close contact with the annular member 10 and has the ends secured in any convenient manner. A similar wire 38 is provided for the flange 35 and maintains said flange in contact with the annular member 20 and has the ends secured in any convenient manner. A duct 39 or the like for a machine is shown in dotted lines and has a flange 40 provided with a plurality of openings 41 adapted to register with the openings 11. This duct 39 may be the inlet or outlet duct of a turbine or the like and the vibration of this duct keeps the rubber in my coupling in a resilient condition. The flanges 11 and 40 may be joined by bolts, screws or similar means. Another duct for the coupling is indicated in dotted lines at 42 which may for example be connected to a turbine 45 or any other suitable vibrating means and has the flange 43 provided with a plurality of openings 44 which register with the openings 19. Flanges 43 and 21 may be joined in any convenient manner.

It will be noted that the construction exemplified in my invention provides an efficient and durable coupling which is not liable to deteriorate, as do couplings in which copper or the like is used as the material constituting the expansion member.

It is obvious that a circulation of cool water could be maintained between the telescopic copper lining and the rubber casing. This circulation could be controlled by obvious means such as a suitable float actuating a valve and thereby maintain the casing at any desired temperature.

When I speak in my claims of means for vibrating one of the members of the coupling I do not intend to indicate that means may not also be provided for vibrating the other members, and when I speak of vibration I mean such a persistently agitated condition in the coupling that the rubber is never at rest relatively to substantially its entire structural constitution.

Various modifications may be made in the construction and arrangement without departing from the spirit and scope of my invention, as set forth in the appended claims.

I claim:

1. A coupling having members, and a casing comprising rubber connecting the members, the coupling being adapted to receive constant thorough and prolonged vibration without appreciable deterioration of the rubber.

2. The process of keeping alive rubber when exposed to high heat, which comprises maintaining a constant vibratory condition in the rubber while thus exposed substantially as and for the purpose described.

3. A coupling comprising a flexible member containing rubber and means for imparting a constant movement to the rubber particles relatively to one another whereby such particles retain their elastic and flexible condition.

In testimony whereof I have hereunto set my hand.

WILLIAM V. SMYTH.